(12) United States Patent
Davis

(10) Patent No.: US 7,154,628 B2
(45) Date of Patent: Dec. 26, 2006

(54) JOB SECURE OVERWRITE FAILURE NOTIFICATION

(75) Inventor: Gary M. Davis, Rochester, NY (US)

(73) Assignee: Xerox Corporation, Stamford, CT (US)

(*) Notice: Subject to any disclaimer, the term of this patent is extended or adjusted under 35 U.S.C. 154(b) by 938 days.

(21) Appl. No.: 10/322,042

(22) Filed: Dec. 17, 2002

(65) Prior Publication Data

US 2004/0114182 A1 Jun. 17, 2004

(51) Int. Cl.
*G06K 15/00* (2006.01)

(52) U.S. Cl. ............. 358/1.16; 358/1.15; 713/193; 360/57

(58) Field of Classification Search .......... 358/1.16, 358/1.15; 360/57; 713/193
See application file for complete search history.

(56) References Cited

U.S. PATENT DOCUMENTS

| | | | | |
|---|---|---|---|---|
| 5,265,159 A | * | 11/1993 | Kung | 713/193 |
| 5,839,033 A | * | 11/1998 | Takahashi et al. | 399/187 |
| 5,890,188 A | * | 3/1999 | Okamoto et al. | 711/5 |
| 6,070,174 A | * | 5/2000 | Starek et al. | 707/206 |
| 6,377,491 B1 | * | 4/2002 | Otani et al. | 365/185.29 |
| 6,834,034 B1 | * | 12/2004 | Yokokawa | 369/53.22 |
| 6,941,479 B1 | * | 9/2005 | Sugiura | 713/300 |
| 7,072,054 B1 | * | 7/2006 | Bunker | 358/1.14 |
| 2003/0079078 A1 | * | 4/2003 | Zipprich et al. | 711/112 |
| 2003/0196100 A1 | * | 10/2003 | Grawrock et al. | 713/193 |
| 2003/0204747 A1 | * | 10/2003 | Gaebel et al. | 713/201 |
| 2004/0114265 A1 | * | 6/2004 | Talbert | 360/60 |
| 2006/0109494 A1 | * | 5/2006 | Kizaki | 358/1.13 |

* cited by examiner

*Primary Examiner*—Kimberly Williams
*Assistant Examiner*—Andrew Lam
(74) *Attorney, Agent, or Firm*—Fay, Sharpe, Fagan, Minnich & McKee, LLP

(57) ABSTRACT

An apparatus and method for erasing jobs from a marking device's non-volatile memory includes a monitor and notification system to detect and make a user aware of failure of the erasure. The notification system can offer alternate methods of erasure as part of the notification.

21 Claims, 10 Drawing Sheets

JOB SECURE OVERWRITE FAILURE NOTIFICATION

CROSS-REFERENCE TO RELATED APPLICATIONS

This application is related to U.S. patent application Ser. No. 09/871,877, filed Jun. 4, 2001 by Bunker, et al., entitled SECURE DATA FILE ERASURE.

FIELD OF THE INVENTION

The invention relates to data security, particularly in marking devices, such as photocopiers, fax machines, and printers.

BACKGROUND AND SUMMARY

Many photocopiers, printers, and other reproduction and printing devices now include non-volatile memory (NVM), such as magnetic and optical storage media and including removable disk systems, hard drives, and other storage media systems allowing the device and/or a user to store a job the device uses or is directed to use the stored job. In high security areas (e.g., military installations), there is often a requirement that all jobs that stored on NVM of a device shall be inaccessible once the job is completed. Additionally, users in lower security area often wish to erase data they would like to keep private or confidential for various reasons.

Lately, secure erase systems that overwrite the data with patterns of 1s, 0s, or random combinations thereof have come into use to meet erasure requirements. However, government agencies and other customers have different requirements as to how many times one can overwrite the appropriate portions of NVM once a job or task is completed, which can lead to difficulties in product design and implementation.

Embodiments of the invention allow a user or a system administrator (SA) to program a device to overwrite the region of NVM in which the data file associated with a print, scan, fax, copy, or other job resides. In embodiments, the data file is overwritten more than once, such as from 2 to about 50 times, with the exact number of overwrites being determined according to a stored default value or a user-input value. Further, in embodiments, the data file can be overwritten with a different pattern on each overwrite according to a stored default value or a user-input value. For example, if a user has just printed something stored on a floppy disk, the user can erase it securely with a sequence of patterns of choice. Instead of trying to settle on a single algorithm (e.g., overwrite 3 times, first time with 1s, the second time with 0s, the third time with a random pattern), this allows overwriting "n" times with a set of patterns that can be downloaded to the device.

Embodiments activate an erase trigger automatically, which places the digital copier or printer into, for example, an Image Disk Erasing Routine, where an Image Disk is a storage media used by the device to store data files including scanned images of documents and/or print job data and the like. An example of such an Erasing Routine is a routine that executes three complete erasures with a check to ensure the data is completely erased; per industry or security approved processes. The Erasing Routine removes or destroys any residual data files including documents, images, and the like, on the Image or ESS Disks. In embodiments, a customer selectable UI/client button with confirmation that the process was completed could activate this routine. During this erasing feature, the system would be offline.

Thus, embodiments provide a storage medium security erase system comprising an erase trigger that tells a drive sector analyzer to retrieve data file location information from a CPU and send the location information to a secure storage medium eraser that overwrites the data file according to a predetermined secure erase method, the eraser using a type of overwrite pattern and a number of overwrites determined by an erase pattern determiner according to predetermined criteria and/or user input.

An additional feature is to apply a method of securely erasing a data file by a providing an erase trigger, determining a location of the data file on the storage medium, overwriting the data file according to a predetermined secure erase method, and determining at least a number of times to overwrite the data file in response to the erase trigger and according to predetermined criteria.

However, it is possible that secure erasure can fail. In such instances, security-conscious users will want to know that failure has occurred. Embodiments provide for such notification and allow implementation of such notification on a UI of a marking device on which failure has occurred, and/or on a personal computer connected to the marking device, such as via a network.

DESCRIPTION

Figure 1:
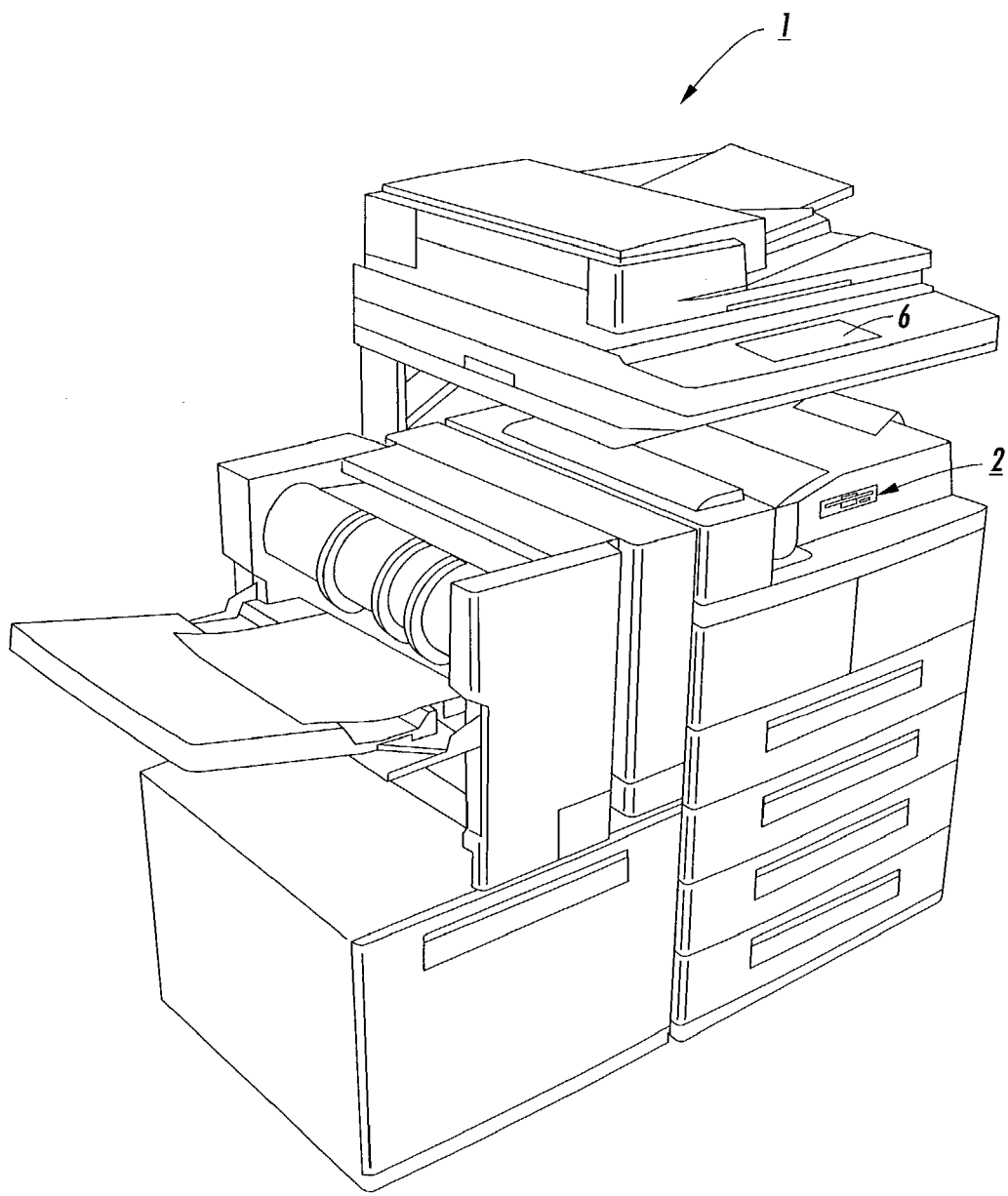
FIG. 1 is a perspective view of a digital printing and/or reproducing device that can use embodiments of the invention.
Figure 2:
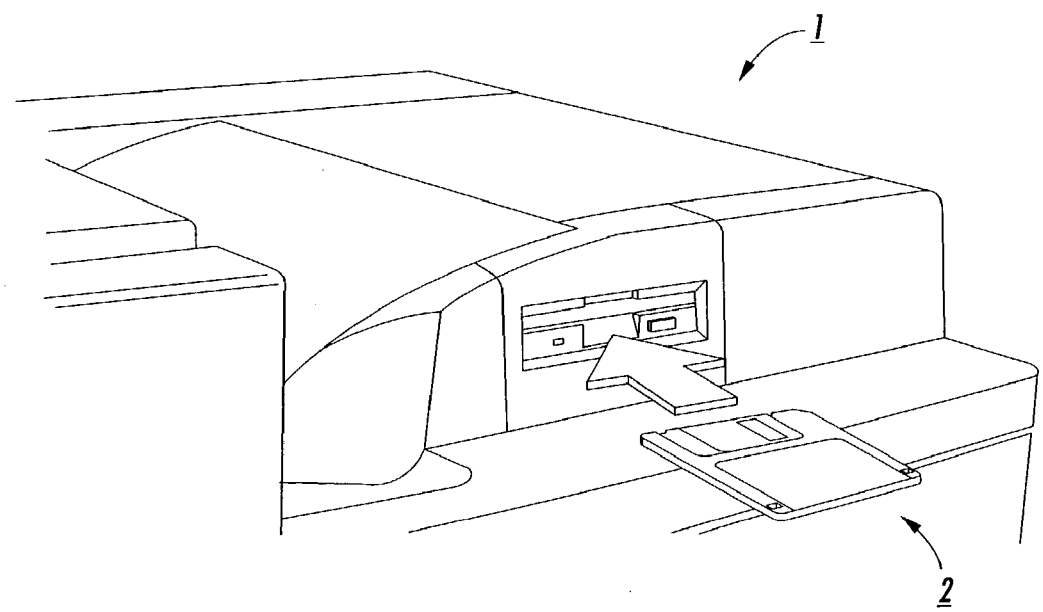
FIG. 2 is a close-up perspective view of a removable storage media drive of the device shown in FIG. 1.

For a general understanding of the present invention, reference is made to the drawings. In the drawings, like reference numerals have been used throughout to designate identical elements.

With reference to the accompanying FIGS., various embodiments of the invention include a device 1, such as a scanner, printer, photocopier, or other device, having a non-volatile memory (NVM) 2, such as a magnetic or optical storage medium, to which the device 1 can store data 3 and/or from which the device can read data 3 stored in a data file 4. The NVM can be a relatively permanently installed hard disk drive, or can be a drive that employs removable media; multiple drives can be used as NVM in embodiments employing combinations of hard disk drives, removable drives, and other NVM. In embodiments, the device 1 can use the data 3 to produce output, such as paper hard copy of a word processing document or the like. When a device 1 experiences a power loss, it will typically check for pending jobs on the NVM 2 when power returns, then complete any incomplete pending jobs.

Figure 3A:
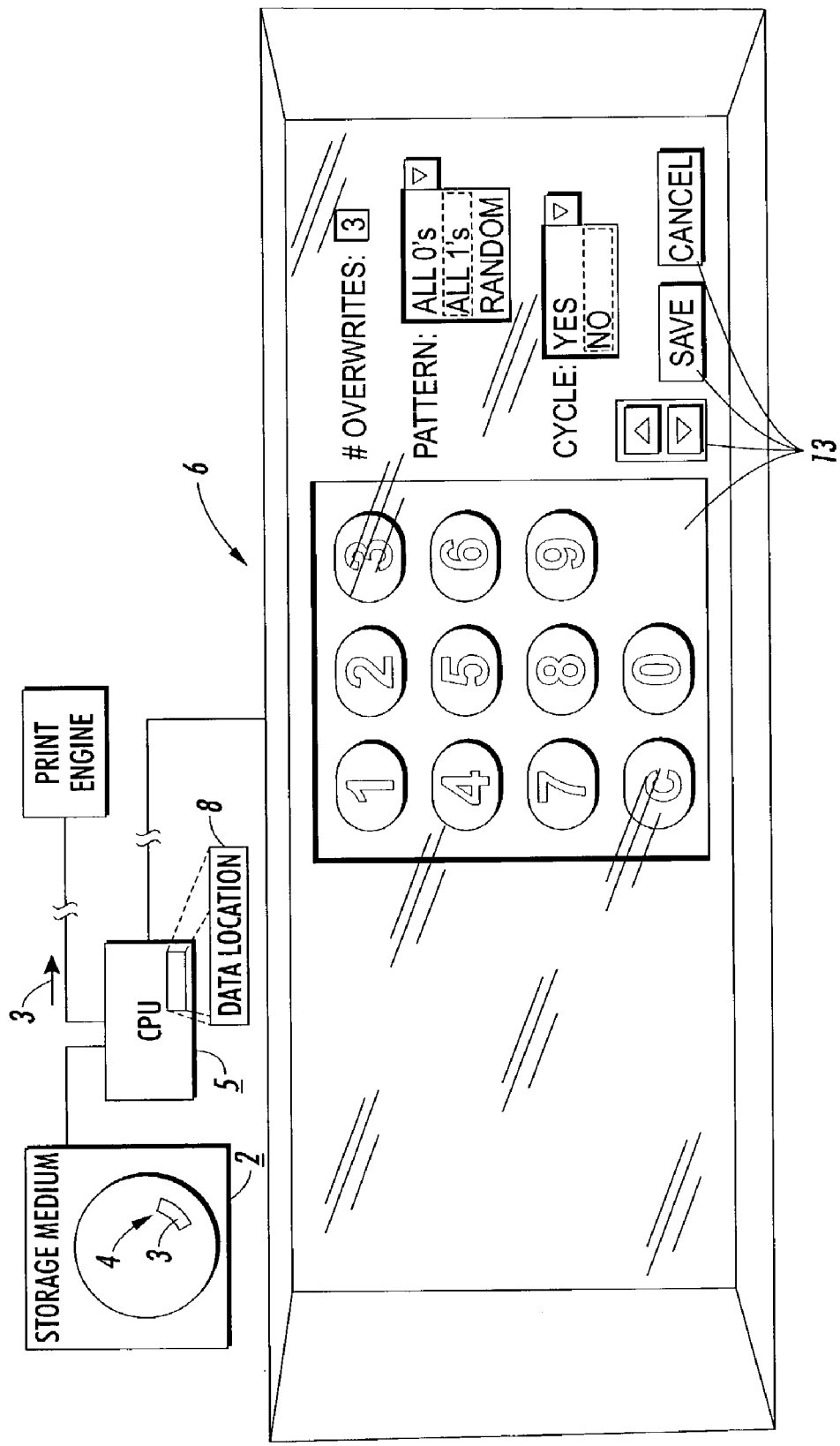
FIGS. 3A, 3B, and 3C are elevational views of a display panel of the device of FIG. 1 showing a graphical user interface in which a user can select parameters according to embodiments.
Figure 3B:
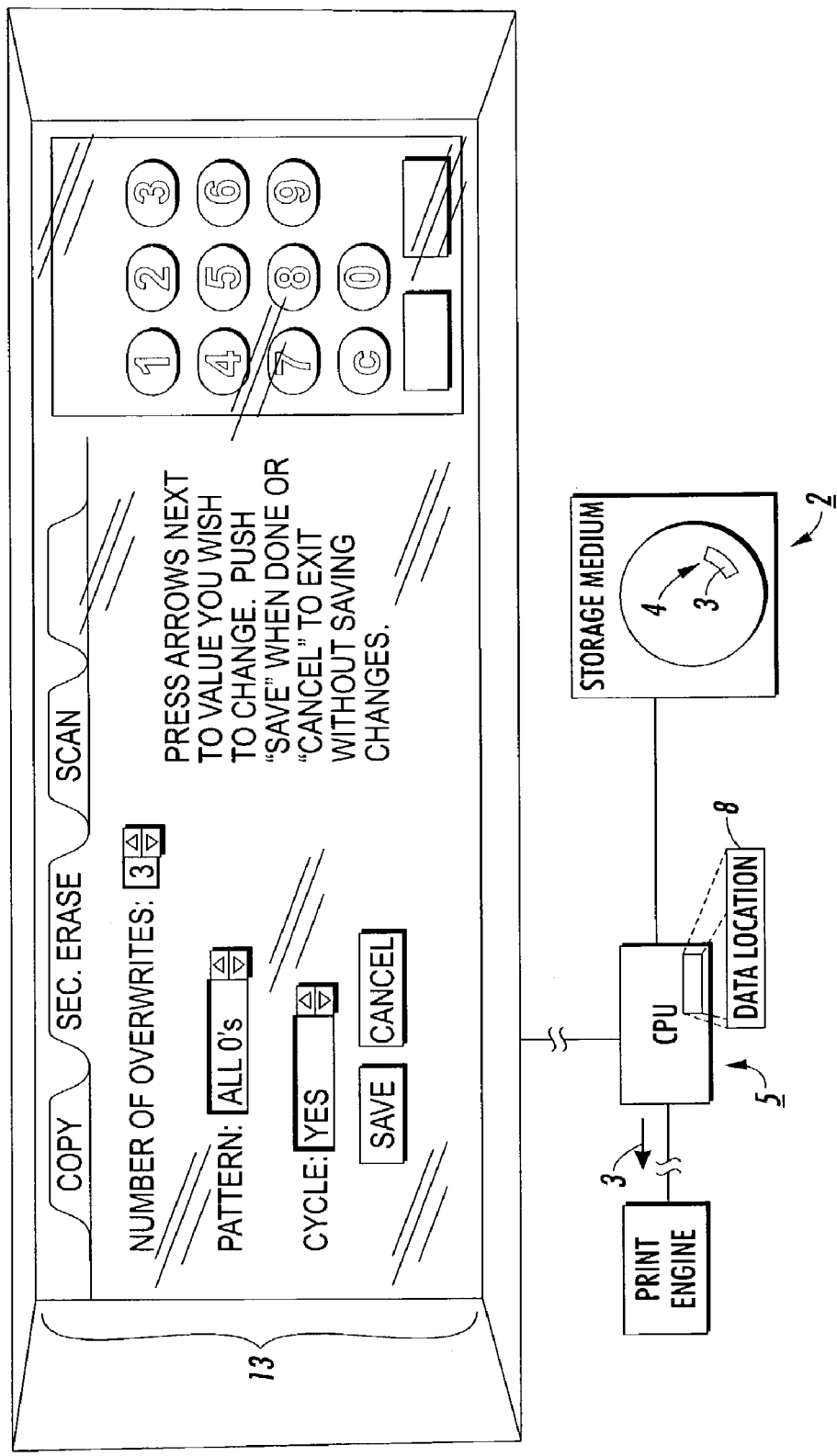
Figure 3C:
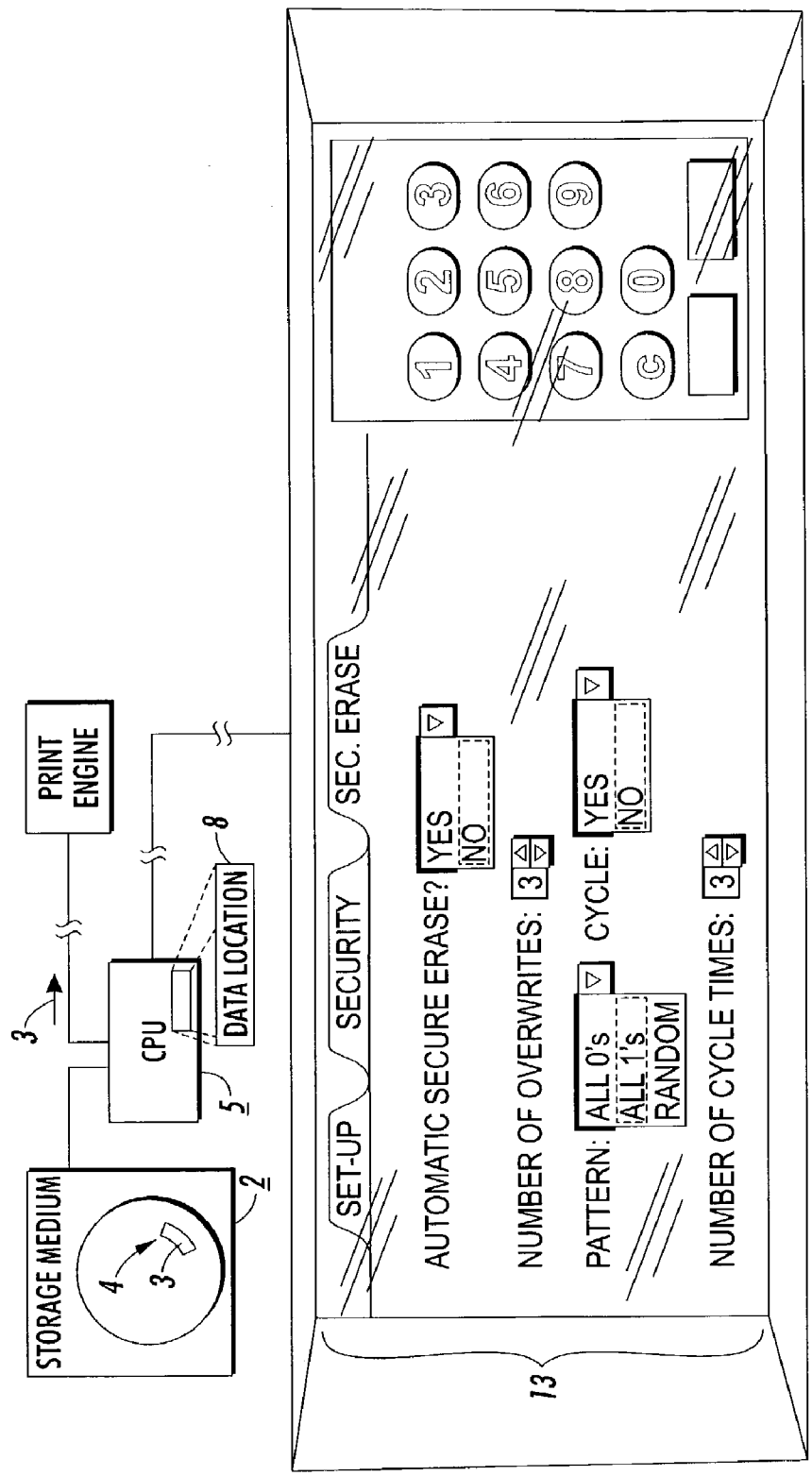
Figure 4:
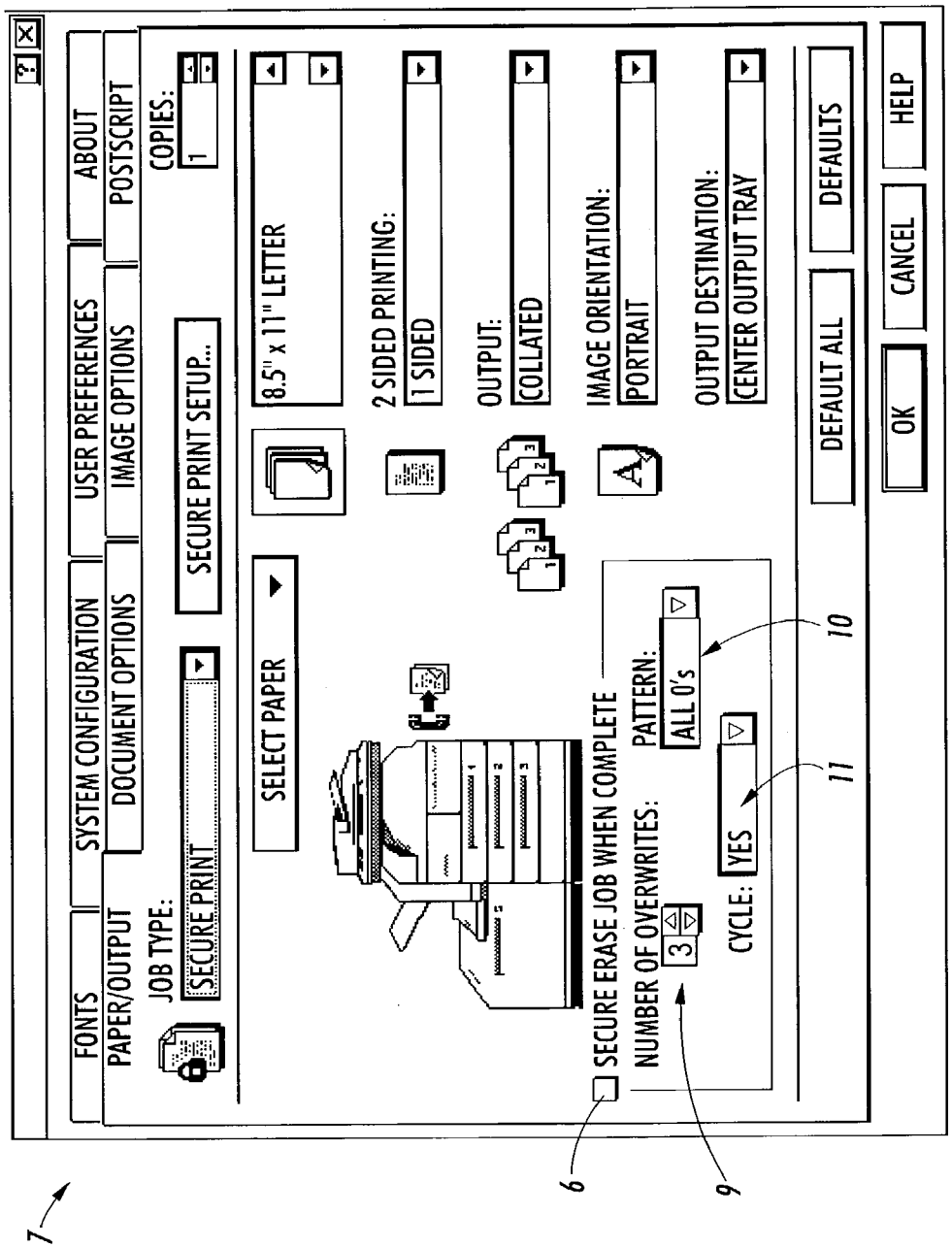
FIG. 4 is a schematic of a graphical user interface dialog box of a driver that can be implemented on a personal computer to control the device shown in FIG. 1, the dialog box allowing selection of parameters of embodiments of the invention.

FIGS. 3A–3C and 4 show user interfaces that could be used according to embodiments. In FIGS. 3A–3C, a graphical user interface (GUI), such as would be used with a LCD touch screen of the device 1, is shown. GUI elements 13 can be included to indicate that erasure should be performed and to control various functions related thereto. FIG. 4 illustrates a print driver-type GUI 7, such as can be used in a print driver or set up application usable on a personal computer or the like. As in the device-based GUI, GUI elements 6, 9–11 can be included for indication of erasure and control of related features.

Figure 5:
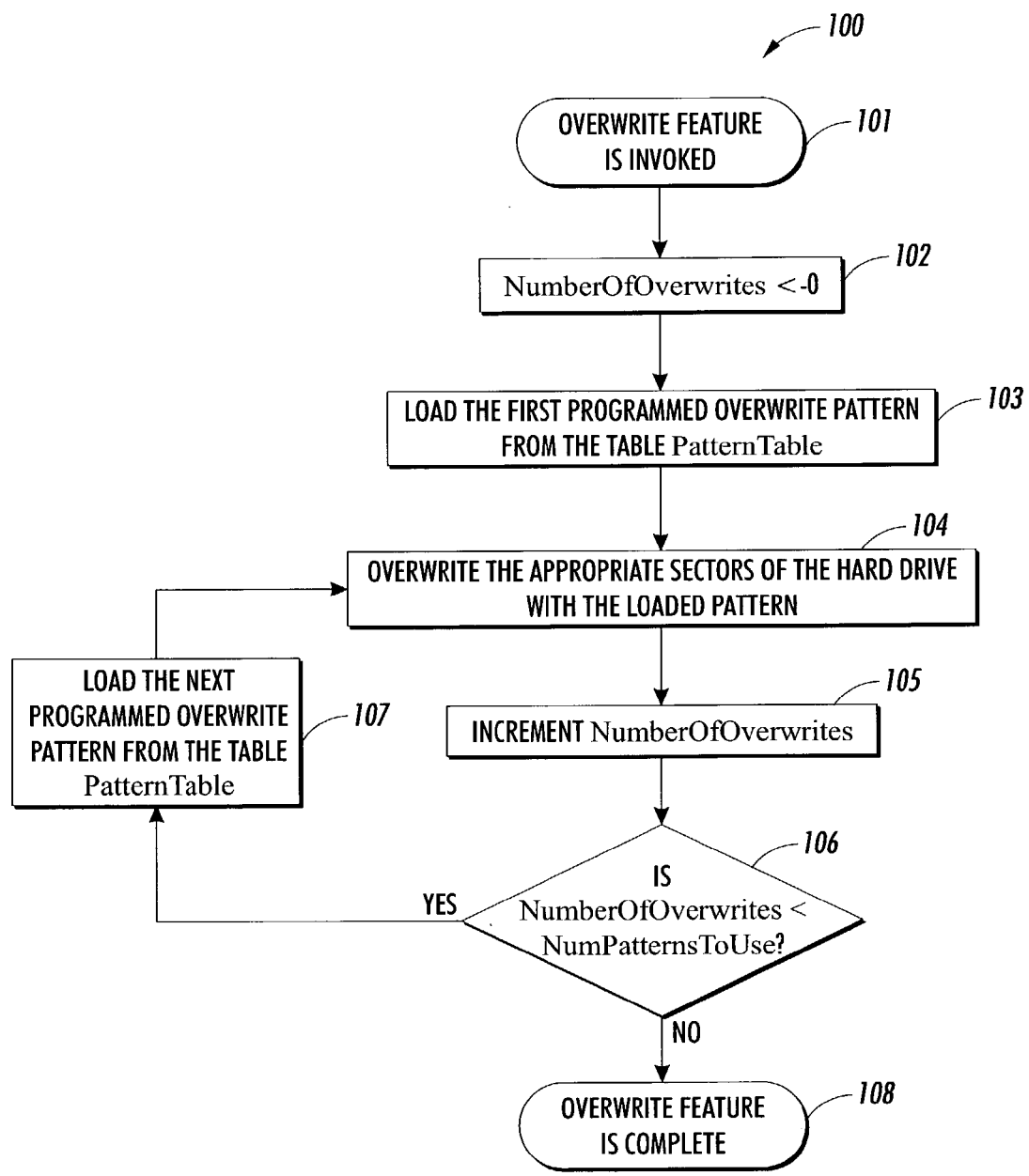
FIG. 5 is a schematic diagram illustrating an overwrite method for secure erasure usable in embodiments.
Figure 6:
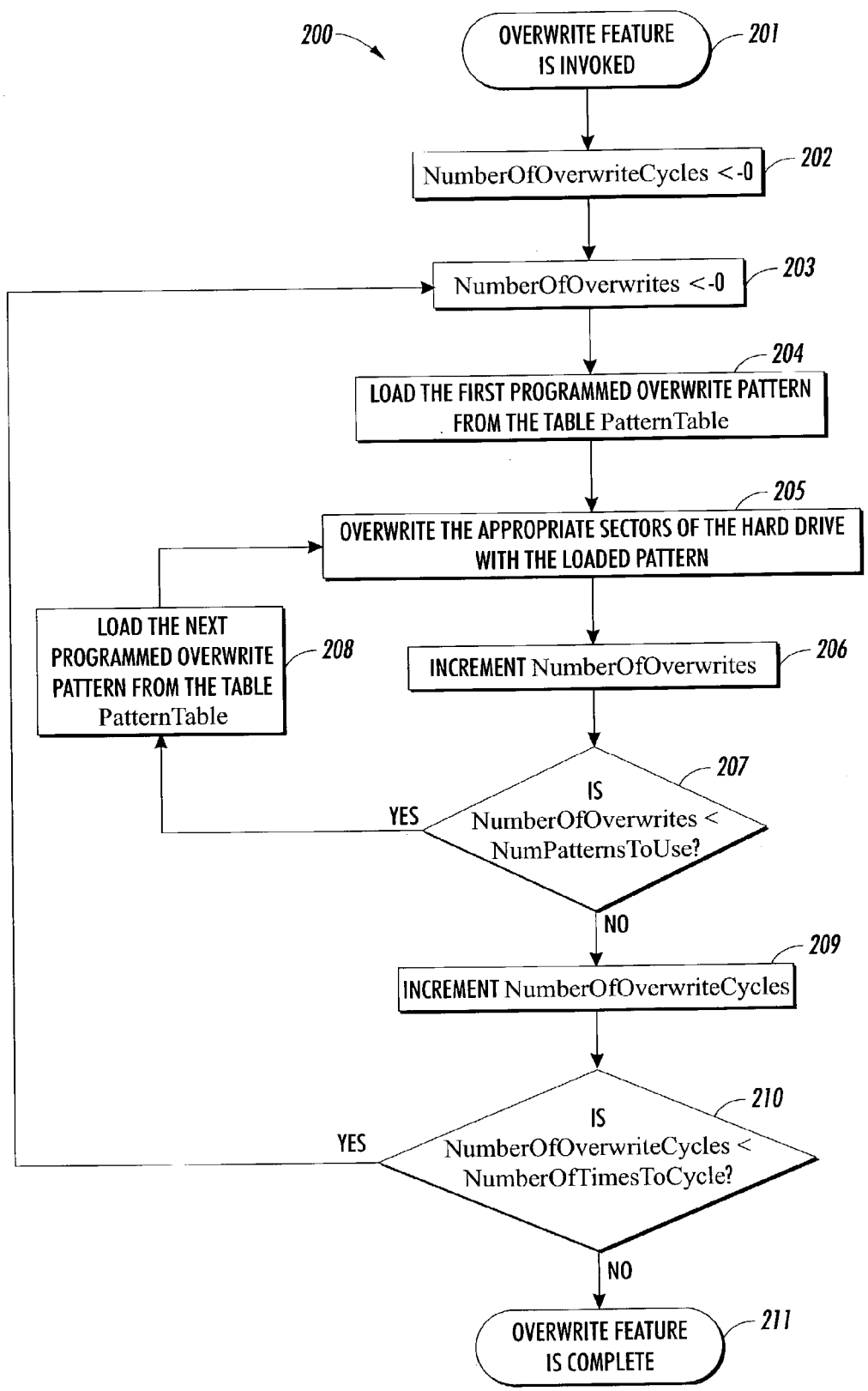
FIG. 6 is a schematic diagram illustrating another overwrite method for secure erasure usable in embodiments.

An example of an erase routine usable in embodiments is illustrated schematically in FIGS. 5 and 6. For example, the CPU 5 can provide or respond to an erase trigger 6. The erase trigger 6 in embodiments can be an instruction sent when the power loss has exceeded the reference period as discussed above. The CPU 5 stores the data file 4 in the NVM 2, which can be a fixed or removable storage medium, and keeps track of the data file 4 so that, when the erase trigger 6 is set, the erasure process can determine a location 8 of the data file on the NVM 2. The erasure process then overwrites the data file 4 according to a predetermined secure erase method; in embodiments of the invention, the secure erase method can include overwriting the data file 4 a particular number of times 9, using a particular pattern 10 to overwrite the data file 4 (such as all 1s, all 0s, etc.), and/or cycling the overwrite pattern on each iteration of the overwrite process 11. Other iteration and pattern variations can also be used.

Figure 7:
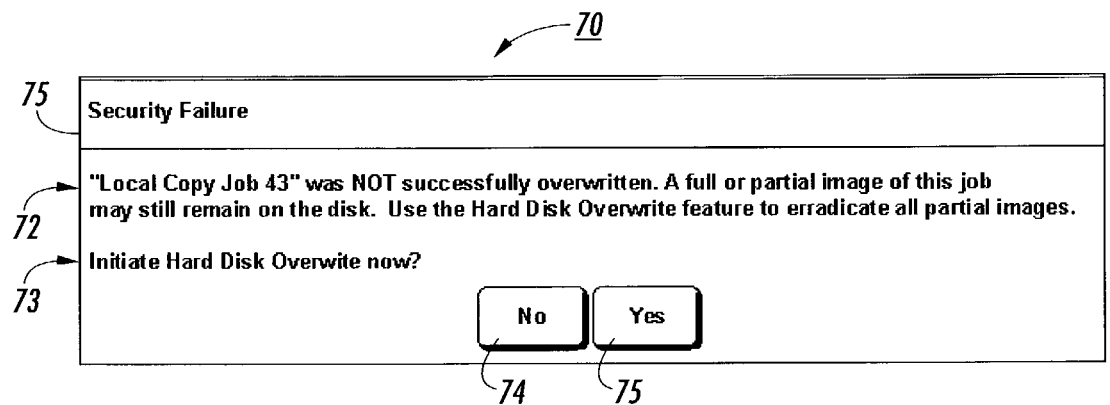
FIG. 7 is a schematic diagram illustrating a personal computer notification GUI according to embodiments.

FIG. 7 schematically illustrates a notification GUI 70 displayable on a personal computer according to embodiments. The notification 70 can include a title bar 71, a message area 72, an alternate method message area 73, and GUI elements 74, 75 to indicate whether a user wishes to use the alternate method offered in the message area 73. Thus, the notification GUI lets a user know that there has been a failure and asks the user whether an alternate method of overwrite/erasure, such as overwriting the NVM, should be applied.

Figure 8:
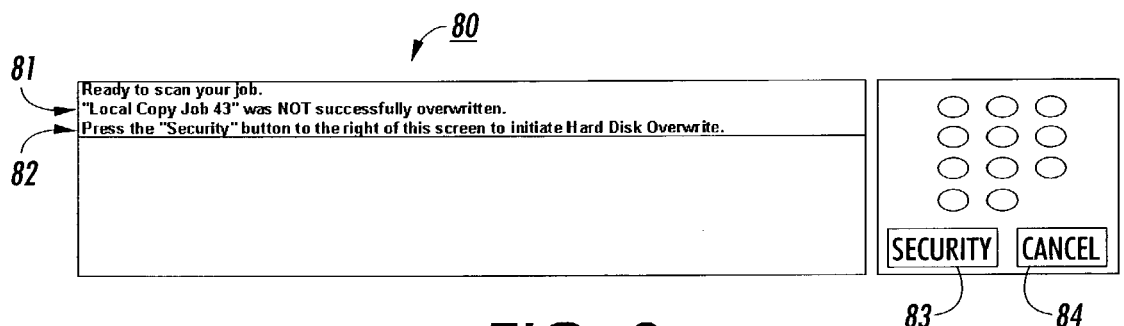
FIG. 8 is a schematic diagram illustrating an on-board device notification GUI according to embodiments.

FIG. 8 schematically illustrates a notification GUI 80 displayable on a UI of the device 1. The notification GUI 80 can include a message area 81 and instructions/request area 82 in which a user can be asked whether an alternate overwrite/erasure method should be used. In embodiments, a user can be directed to use physical buttons 83, 84 to initiate or cancel the alternate overwrite/erasure method. Alternatively, the buttons 83,84 can be GUI elements in the UI of the device 1.

Figure 9:
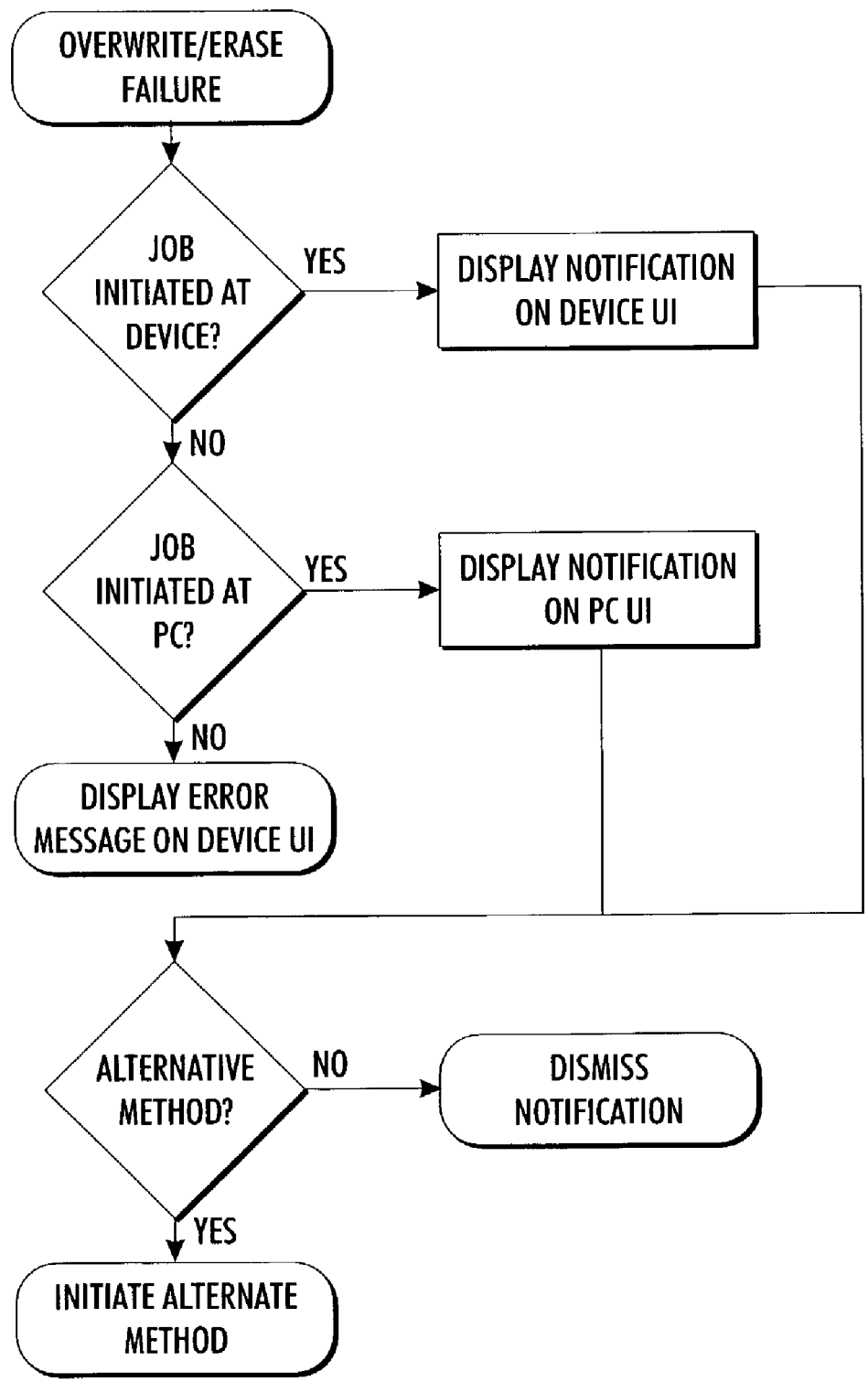
FIG. 9 is a schematic diagram illustrating a method by which notification of failure can be provided according to embodiments.

FIG. 9 schematically illustrates the method underlying the GUIs of FIGS. 7 and 8. Upon an overwrite/erase failure, the system checks to see whether the job was initiated at the device 1. If so, then the system displays the failure notification 80 on the UI of the device 1, at which point the user can select an alternate method of overwriting/erasure. If the job was not initiated at the device 1, the system checks to see if the job was initiated at a personal computer. If so, then the system displays the failure notification 70 on the personal computer, at which point the user can select an alternate method of overwriting erasure. If the user elects to proceed with the alternate method, the alternate method is initiated and the process ends. If the user elects to forego the alternate method, the process simply ends. If the system can not determine where the job was initiated, it displays an error message on the UI of the device. Variations on the method illustrated schematically in FIG. 9 can include, for example, automatically engaging the alternate method and notifying the user, displaying notifications at the device and the personal computer, and other combinations. For example, the notification could be displayed on a web page of the marking device 1 accessible via a computer network to which the marking device 1 is connected. Additionally, the user that is notified can be the user that initiated the secure erasure, an administrator of technology, a security officer, some other designated user, or any combination of these.

With additional reference to FIGS. 5 and 6, and in greater detail, to determine at least a number of times to overwrite the data file 4, the erasure process can check or respond to, for example, the erase trigger 6, which can include this information. Alternatively, embodiments can allow a system administrator (SA) to program the device 1 to overwrite the data file 4 according to predetermined criteria, such as a stored number of overwrites 9 and/or sequence of patterns 10 of choice. Rather than trying to settle on a single algorithm (e.g., overwrite 3 times, first time with 1s, the second time with 0s, the third time with a random pattern) for all customers, this allows selection by the SA during setup or reconfiguration of the device 1. Further, embodiments of the invention can allow the SA to program a timer that will automatically delete all data files after a specified period has elapsed.

Where more than one pattern 10 is available, a set of patterns 12 can be stored in a storage medium 2 in communication with the system. The set of patterns 12 can be stored in a computer memory or another storage medium in, for example, a table, such as a table resembling the pseudocode expression:

PatternTable (N) ←Pattern1, Pattern2, Pattern3, . . . PatternN.

The invention can then use the set of patterns 12, the number of times to overwrite 9, and a pattern selection variable to erase the data file 4 by overwriting. For example, in embodiments of the invention, the user-selected pattern NumPatternToUse to be used and a number of times N to overwrite the data file 4 according to the pseudocode expression:

For count ←1 to NumPatternToUse Do
   Overwrite region of storage media that stored the data file with
     PatternTable(count);

FIGS. 5 and 6 show two flow charts that show how embodiments of the invention might carry out the erasure process. Referring to FIG. 5, an embodiment of the process 11 using predetermined patterns from a pattern table, as well as a predetermined number of patterns to use (expressed by the variable NumPatternsToUse) is shown in flow chart 100. The erase trigger 6 is represented in the beginning block 101 of the flow chart 100 and an initial step is to set the counter NumberOfOverwrites to 0 as shown in block 102. Next, the first overwrite pattern is loaded from the pattern table, as seen in block 103. The data file 4 is overwritten using the loaded pattern as illustrated in block 104, and the NumberOfOverwrites is incremented as seen in block 105. The counter is compared to the number of patterns to use as shown in block 106. If the counter value is less than the number of patterns to use, then the next pattern is loaded as seen in block 107, and the steps shown in blocks 104–107 continue to be executed until the counter value is no longer less than the number of patterns to use, at which point the overwrite is complete, as expressed in block 108.

Referring to FIG. 6, an embodiment of the invention 11 using predetermined patterns from a pattern table, as well as a predetermined number of patterns to use (expressed by the variable NumPatternsToUse) is shown in flow chart 200 with the added feature of a number of overwrite cycles to be completed. The erase trigger 6 is represented in the beginning block 201 of the flow chart 200 and an initial step is to set the counter NumberOfOverwriteCycles to 0 as shown in block 202, then to set the counter NumberOfOverwrites to 0 as shown in block 203. Next, the first overwrite pattern is loaded from the pattern table, as seen in block 204. The data file 4 is overwritten using the loaded pattern as illustrated in block 205, and the NumberOfOverwrites is incremented as seen in block 206. The counter NumberOfOverwrites is compared to the number of patterns to use as shown in block 207. If the counter value is less than the number of patterns to use, then the next pattern is loaded as seen in block 208, and the steps shown in blocks 205–208 continue to be executed until the counter NumberOfOverwrites has a value that is no longer less than the number of patterns to use, at which point the particular overwrite is complete and the counter NumberOfOverwriteCycles incremented, as expressed in block 209. As shown in block 210, the value of the counter NumberOfOverwriteCycles is compared to a predetermined NumberOfTimesToCycle. If this counter value is less than the number of times to cycle, then the counter NumberOfOverwrites is reset, and the steps shown in blocks 203–210 continue to be executed until the counter NumberOfTimesToCycle has a value that is no longer less than the number of times to cycle, at which point the particular overwrite is complete as seen in block 211.

As should be readily apparent to one of ordinary skill in the art, the preprogrammed values of NumberOfOverwrites and NumberOfTimesToCycle, as well as the preselected patterns, of the particular processes shown in FIGS. 5 and 6 could be user selected values entered into the system using apparatus and methods such as those shown in FIGS. 3 and 4, among others.

Thus, in installations where customers wish to ensure data security, such as high security areas like military installations, customers can meet the requirement that all printed/copied jobs stored on hard drive(s) or other storage media of such devices be inaccessible once the job has completed without removing the storage medium. In addition, many customers simply want to ensure the privacy of their information and wish to erase print and/or copy jobs from storage media on which the jobs might be stored. The current conventional method of deleting a file (deleting the pointers to the data) can still be done, but the method according to embodiments of the invention ensures that data files themselves no longer reside on the disk and can not be recovered.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. In a marking device including a secure overwrite erasure system, an erasure failure notification method comprising:
   determining that an erase routine has failed;
   determining from where the erase routine was initiated;
   displaying a failure notification where the erase routine was initiated; and
   providing an alternate erasure option.

2. The method of claim 1 wherein determining from where the erase routine was initiated comprises determining whether the erase routine was initiated on the marking device.

3. The method of claim 2 wherein displaying a failure notification on a GUI of the marking device.

4. The method of claim 2 wherein providing an alternate erasure option comprises enabling a hardware button of the marking device to selectively initiate the alternate erasure option.

5. The method of claim 2 wherein providing an alternate erasure option comprises providing a GUI element to selectively initiate the alternate erasure option.

6. The method of claim 1 wherein determining from where the erase routine was initiated comprises determining whether the erase routine was initiated from a personal computer in communication with the marking device.

7. The method of claim 6 wherein displaying includes displaying a failure notification on a GUI of the personal computer.

8. The method of claim 6 wherein providing an alternate erasure option comprises providing a GUI element to selectively initiate the alternate erasure option.

9. The method of claim 1 performed by a controller of the marking machine.

10. An erasure failure notification method comprising: providing a secure overwrite erasure system in a marking device; monitoring the secure overwrite system to determine whether the system completes erasures; notifying a user when the system fails; wherein the notifying includes displaying a message on a machine from which the secure overwrite was initiated; and offering at least one alternate erasure method.

11. The method of claim 10 wherein displaying includes displaying the message on a personal computer GUI.

12. The method of claim 10 wherein displaying includes displaying on a UI of the marking device.

13. The method of claim 10 wherein offering includes showing a request when notifying.

14. The method of claim 10 wherein offering includes enabling at least one respective hardware button of the marking machine to initiate the at least one alternate erasure method.

15. The method of claim 10 wherein offering includes displaying at least one respective GUI element to initiate the at least one alternate erasure method.

16. An erasure failure notification apparatus of a marking device comprising: a secure overwrite erasure system monitor; a notification GUI element displayable when the monitor detects failure of a secure overwrite erasure; wherein the notification GUI element includes a message which is displayed on a machine from where the secure overwrite erasure was initiated; and at least one alternate erasure system.

17. The apparatus of claim 16 wherein the notification GUI element becomes part of a personal computer GUI.

18. The apparatus of claim 16 wherein the notification GUI element becomes part of a UI of the marking device.

19. The apparatus of claim 16 wherein the notification GUI element comprises a request when displayed and at least one respective initiation element associated with the at least one alternate erasure system.

20. The apparatus of claim 16 wherein the at least one respective initiation element associated with the at least one alternate erasure system includes at least one respective hardware button of the marking machine to initiate the respective associated at least one alternate erasure method.

21. The apparatus of claim 16 wherein the at least one respective initiation element associated with the at least one alternate erasure system includes at least one respective GUI element to initiate the at least one respective associated alternate erasure method.

* * * * *